US006326427B1

(12) United States Patent
Birnbrich et al.

(10) Patent No.: US 6,326,427 B1
(45) Date of Patent: Dec. 4, 2001

(54) USE OF AMPHIPHILES FOR PERMANENT IMPROVEMENT OF ADHESIVE AND/OR COATING COMPATIBILITY OF POLYOLEFIN BASED SHAPED BODIES

(75) Inventors: Paul Birnbrich, Solingen; Herbert Fischer, Duesseldorf; Joerg-Dieter Klamann, Bremerhaven; Martin Schaefer, Krefeld; Rolf Tenhaef, Duesseldorf, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/381,840
(22) PCT Filed: Mar. 16, 1998
(86) PCT No.: PCT/EP98/01511
  § 371 Date: Dec. 2, 1999
  § 102(e) Date: Dec. 2, 1999
(87) PCT Pub. No.: WO98/42776
  PCT Pub. Date: Oct. 1, 1998

(30) Foreign Application Priority Data

Mar. 25, 1997 (DE) .............................. 197 12 380

(51) Int. Cl.⁷ .................. C08K 5/04; C08K 3/10
(52) U.S. Cl. .................. 524/398; 524/413; 524/431; 524/440
(58) Field of Search .................. 524/398, 413, 524/431, 440

(56) References Cited

U.S. PATENT DOCUMENTS

| | | | |
|---|---|---|---|
| 3,314,813 | 4/1967 | Maxion | 117/12 |
| 3,316,232 | 4/1967 | McGann | 260/93.7 |
| 4,393,159 | 7/1983 | Lybrand | 524/243 |
| 5,045,387 | 9/1991 | Schmalz | 428/284 |
| 5,318,841 | * 6/1994 | Gardiner et al. | 428/343 |
| 5,660,931 | * 8/1997 | Kim et al. | 428/357 |

FOREIGN PATENT DOCUMENTS

| | | |
|---|---|---|
| 0 311 723 | 4/1989 | (EP) . |
| 0 372 890 | 6/1990 | (EP) . |
| WO88/07564 | 10/1988 | (WO) . |
| WO93/12171 | 6/1993 | (WO) . |
| WO97/12694 | 4/1997 | (WO) . |

* cited by examiner

Primary Examiner—Kriellion A. Sanders
(74) Attorney, Agent, or Firm—John E. Drach; Steven J. Trzaska

(57) ABSTRACT

A process for making a polyolefin composition having improved adhesive and/or coating compatibility involving: (a) providing a polyolefin; (b) providing from 0.01 to 10% by weight, based on the weight of the polyolefin, of a migratable amphiphile; (c) providing from 0.01 to 1000 ppm, based on the weight of the polyolefin, of a transition metal selected from the group consisting of titanium, tin, and mixtures thereof; and (d) combining (a)–(c) to form the polyolefin composition.

20 Claims, No Drawings

USE OF AMPHIPHILES FOR PERMANENT IMPROVEMENT OF ADHESIVE AND/OR COATING COMPATIBILITY OF POLYOLEFIN BASED SHAPED BODIES

BACKGROUND OF THE INVENTION

This invention relates to the use of amphiphiles for permanently improving the adhesive and/or coating compatibility of polyolefin-based moldings, fibers and films.

Molded workpieces of any three-dimensional form, including polyolefin-based moldings, fibers and films, are used on a very wide scale in practice. An important problem area here is improving the surface properties of these structurally nonpolar hydrocarbon components. Thus, the poor adhesion of coatings and adhesives is a central problem which has remained unsolved for decades despite numerous attempts to find a solution. A comprehensive account of the various proposals which have been made with a view to solving the stated problem can be found, for example, in EP 0 311 723 to which reference is made here.

It is known from the prior art that the compatibility of plastic surfaces with coatings and adhesives can be improved, for example, by oxidative after treatment processes, such as corona or plasma treatment. In processes such as these, the surface of the plastic is oxidized or chemically modified in the presence of gases and discharges, so that certain surface properties of the plastic can be modified. However, apart from their high energy consumption, processes such as these always involve an additional step and lead to ozone emissions in the manufacture of plastic parts.

In addition, chemical pretreatment processes, including for example treatment with fluorine or chlorine gas, with chromosulfuric acid or fluorosulfonic acid, etc., have also been known for some time.

EP-B-372 890 describes polyolefin- or polyester-based fibers with a lubricant adhesively applied to their surface. This lubricant comprises a mixture of (1) fatty acid diethanolamide, (2) a polyether-modified silicone, (3) a sorbitan fatty acid ester and (4) a metal salt of an alkyl sulfonate. Components (1) to (4) are present in special quantity ratios. According to page 3, lines 20 to 26, the mixture of components (1) to (4) is applied to the surface. The technique by which the mixture containing the four components is applied to the surface of fibers is described in detail on page 4, lines 6 to 9. The application techniques mentioned include a) the use of rollers, b) spraying and c) immersion. Accordingly, the process according to EP-B-372 890 is a process in which a mixture of components (1) to (4) is applied to the surface of polyolefin moldings in an additional process step. ad Accordingly, the expression "adhesively applied to the fiber surface" used in claim 1 of EP-B-372 890 may be clearly interpreted by the expert to mean that any adhesion involved is loose and temporary, for example in the form of relatively weak adhesion forces, and cannot in any way to be considered to represent permanent anchorage.

U.S. Pat. No. 5,045,387 describes the treatment of polyolefin-based fibers or films in which special polyalkoxylated polydimethyl siloxanes or alkoxylated ricinoleic acid derivatives are applied to the surface.

In view of the very widely used traditional chemical after treatment processes, such as corona and plasma treatment, it is known to the expert that no exact statements can be made as to the various processes involved. However, it has been established that oxidative surface changes occur and result in the formation of certain "active centers". However, their concentration generally decreases with time so that the pretreatment effect also is only in evidence for a certain time, generally not more than 72 hours (cf. for example, Klaus Stoeckert (Editor), "Veredein von Kunststoff-Oberflächen", Munich 1974, page 137).

One feature common to all the known processes is that, in general, the desired surface effects are only temporarily present.

EP-B-616 622 relates to extrudable compostable polymer compositions comprising an extrudable thermoplastic polymer, copolymer or mixtures thereof containing a degradation-promoting system of an auto-oxidative component and a transition metal. The auto-oxidative system comprises a fatty acid, a substituted fatty acid or derivatives or mixtures thereof, the fatty acid having 10 to 22 carbon atoms and containing at least 0.1% by weight of unsaturated compounds and at least 0.1% by weight of free acid. The transition metal is present in the composition in the form of a salt in a quantity of 5 to 500 ppm and is selected from the group consisting of cobalt, manganese, copper, cerium, vanadium and iron. In the form of a film around 100 microns thick, the composition is said to be oxidatively degradable to a brittle material over a period of 14 days at 60° C. and at a relative air humidity of at least 80%.

DESCRIPTION OF THE INVENTION

The problem addressed by the present invention was to provide auxiliaries with which the adhesive and/or coating compatibility of polyolefin-based moldings, fibers and films could be lastingly and permanently improved. In other words, the object of the invention was to provide auxiliaries for permanently improving the affinity of polyolefin surfaces for adhesives and/or coatings. More particularly, the object of invention was to make it possible to establish high-strength bonds which would rule out unwanted adhesive failures and would ensure that the adhesive joint could only be destroyed by cohesive failure or by combined cohesive/adhesive failure.

The present invention relates to the use of amphiphiles for permanently improving the adhesive and/or coating compatibility of polyolefin-based moldings, fibers and films, characterized in that a mixture containing a) predominantly one or more polyolefins,
b) 0.01 to 10% by weight, based on the polyolefins, of one or more migratable amphiphiles (additives 1) and
c) 0.01 to 1000 ppm of one or more transition metal compounds (II)—metal content of the transition metal compounds (II) based on the polyolefins—in which the transition metal is selected from the group consisting of titanium and tin is subjected in the usual way to molding by extrusion, calendering, injection molding and the like at temperatures in the range from 180 to 320° C.

The additives according to the invention are also referred to hereinafter as additives (I). They are amphiphilic compounds. An amphiphile is understood in common usage to be a compound which combines hydrophilic and hydrophobic molecule parts. In other words, the molecular structure of amphiphiles contains as it were a "combination" of a suitable oleophilic basic molecule based on a hydrocarbon which contains one or more substituents of high polarity. The substituents of high polarity are formed in known manner by hetero atom-containing molecule constituents, particular significance being attributed in this regard to the hetero atoms oxygen, nitrogen and/or halogen for forming the functional group(s) of high polarity.

The use of the amphiphiles in accordance with the invention ensures that coatings or adhesives are able permanently to adhere to the plastic without any additional pretreatment. Adhesive and/or coating compatibility values once established remain intact for long periods or occasionally even increase in the event of continuing storage. According to the invention, there are basically no restrictions on the adhesives and coating compositions which can be brought into contact with the polyolefins surface-modified in accordance with the invention so that permanent bonding or coating is achieved. Thus, so far as the adhesives are concerned, any adhesives familiar to the expert, more particularly commercially available adhesives, may be used. So far as coatings are concerned, attention is drawn in particular to paints. Paints are liquid or powder-form, solid substances which are applied to surfaces in thin layers and which form a firm decorative and/or protective film on those surfaces by chemical reaction and/or physical processes. Other coatings are, for example, insulating materials and metals.

The mixture containing components a), b) and c) is used by traditional molding techniques well-known to the expert, such as extrusion, calendering, injection molding and the like, in a preferred embodiment of the present invention, the melt of the mixture containing components a), b) and c) comes into contact with oxygen, more especially atmospheric oxygen, in the course of the molding process. In the case of extrusion, for example, this happens when the melt leaves the extruder through the extrusion die. The preferred embodiment mentioned above enables oxidative—optionally catalytically assisted—processes, for example oxidatively induced crosslinking—and hence ultimately immobilization—of olefinically unsaturated molecule constituents of the additives (1) to form relatively high molecular weight compounds, oxidatively induced oxidation of activated methylene groups which are present in the immediate neighborhood of the polar groups of the amphiphiles (I) and other oxidative reactions and secondary reactions to take place. (Atmospheric) oxygen can act on the one hand on the surface itself and, on the other hand, even in the interior of the plastic—especially in zones near the surface—to which it is capable of diffusing.

The additives (I) suitable for use in accordance with the present invention have relatively low molecular weights, a pre-requisite for reasonably rapid migration. An upper limit to the molecular weight of suitable internal additives (I) is at about 5,000 D (dalton), preferably at values of at most about 3,000 D and more preferably at maximum values of about 1,000 D. Expression of the molecular weight in "daltons" is known to be the definition of the absolute molecular weight. Accordingly, by comparison with the polyolefins with their molecular weights of several million, the additives (I) are comparatively low molecular weight compounds. The lower limit to the molecular weight of these internal additives (I) is at about 50 to 100 D, preferably at 150 to 180 D and more preferably at around 200 to 300 D.

The use of the amphiphiles in accordance with the invention guarantees the compatibility of coatings or adhesives subsequently applied with the polyolefin surface with virtually no time limit. The expression "with virtually no time limit" applies both to the time interval between production of the particular polyolefin-based molding and its surface coating or bonding in a separate process step and to the time interval between production of the coated or bonded product and its practical application.

The preferred additives (I) according to the invention are amphiphiles of which the hydrophobic molecule parts at least partly contain olefinically unsaturated functions which are particularly readily accessible to radical-induced crosslinking reactions in the vicinity of the plastic surface. Preferred additives (I) are those which, in the unreacted state, have iodine values of at least about 10, preferably of at least about 30 to 40 and more preferably of at least about 45 to 50. The choice of the method by which the iodine value is determined is basically of minor importance. In the context of the present invention, however, reference is specifically made to the methods developed by Hanus and Wijs, which have long been part of Section C-V of the "DGF-Einheitsmethoden", and to the equivalent method developed by Fiebig (cf. Fat Scl. Technol. 1991, No. 1, pages 13–19).

As will be shown in more detail hereinafter, both monoolefinically unsaturated hydrocarbon radicals and polyolefinically unsaturated hydrocarbon radicals may be provided in the additives (I) used in accordance with the invention. Combinations of several corresponding compounds are also important auxiliaries for the use according to the invention. The iodine values of the additives (I) used may assume values above 80 to 90 and, more particularly, values above 100. Highly unsaturated additive components with iodine values of up to about 200 or even higher, for example in the range from 120 to 170, are auxiliaries in the context of the use according to the invention.

In the three-dimensional structure of their hydrocarbon radical, these internal additives (I) may be both straight-chained and branched and/or may have a cyclic structure.

Basically, suitable substituents of high polarity are functional groups which are distinguished in particular by a content of hetero atoms and preferably by a content of O, N and/or halogen. The expression "functional group" is used in its most general sense in the context of the present invention and is understood to apply to groups of atoms which have a characteristic reactivity and which contain one or more hetero atoms. Accordingly, this definition encompasses for example OH groups (simple atomic groups) or N-containing heterocycles (more complex atomic groups), but not C+C-double bonds (no hetero atom) per se, unless they are present in addition to the hetero atoms in more complex atomic groups. Groups from the following classes are mentioned purely by way of example: carboxyl, hydroxyl, amino, oxazoline, imidazoline, epoxide and/or isocyanate groups and/or derivatives thereof. The group of such derivatives includes, for example, ester groups, ether groups, amide groups/alkanolamine and/or alkanolamide groups.

A very important class of substituents of high polarity in the context of the present invention are N-containing heterocycles and/or derivatives thereof, for example pyridazine, pyrimidine, pyrazine, pyridine, azane and azinane groups. Thiazole, thiazolane, thiazolidine, pyrrole, azolane, azolidine, pyrazole and isooxazole groups are particularly suitable, imidazole, imidazoline, diazolidine, oxazoline, oxazole, oxazolidine and oxazolidane groups being most particularly suitable.

A particularly preferred class of additives (I) are compounds which, on the one hand, contain one or more olefinically unsaturated functions in the hydrophobic part of the molecule and, on the other hand, extremely polar functions, such as oxazoline, imidazoline, sulfonate, phosphonate or carboxyl groups (or salts thereof), in the hydrophilic part of the molecule.

Certain individually selected additives of the type mentioned in the foregoing and mixtures of several corresponding auxiliaries may be used as the additive (I). By suitably selecting the substituents of high polarity in the particular auxiliaries of this class of additives used, the coating or adhesive compatibility to which the end product is to be adjusted can be influenced in a predetermined manner. However, mixtures of the type in question here are also corresponding mixtures which, so far as their functional group is concerned, can be assigned to a sub-class, i.e. for example contain carboxyl groups as substituents of high polarity, but contain different basic structures in their hydrocarbon molecule. It is known that corresponding mixtures are obtained in particular when mixtures of the type in question based on natural materials are used. For example, olefinically unsaturated fatty acid mixtures of vegetable and/or animal origin or derivatives thereof can form valuable additives of the additive (I) type in the context of the teaching according to the invention.

As known per se to the expert, different improvements in coating or adhesive compatibility can be expected according to the particular groups of high polarity present. Relevant specialist knowledge may be applied in this regard.

Another possibility of varying the internal additives (I) according to the invention lies in the number of functional substituents of high polarity in the particular basic hydrocarbon skeleton. Even one substituent of high polarity can lead to the permanent and at the same time marked increase in coating or adhesive compatibility required, especially after adaptation of the type and quantity of functional groups available. In addition, however, it has been found that the presence of two or more such substituents of high polarity in the particular molecule of the additive (I) can be an important additional feature for increasing coating or adhesive compatibility.

Reference is made here purely by way of example to the class of so-called dimer fatty acids. Dimer fatty acids are known among experts to be carboxylic acids obtainable by oligomerization of unsaturated carboxylic acids, generally fatty acids, such as oleic acid, linoleic acid, erucic acid and the like. The oligomerization is normally carried out at elevated temperature in the presence of a catalyst, for example of alumina. The products obtained are mixtures of various subtances in which the dimerization products predominate. However, small amounts of higher oligomers, especially trimer fatty acids, are also present. Dimer fatty acids also contain monomers or monofunctional fatty acids from their production. Dimer fatty acids are commercially available products and are marketed in various compositions and qualities. In the same way as dimer fatty acids, trimer fatty acids are oligomerization products of unsaturated fatty acids in which the percentage content of trimers in the product predominates. Dimer and trimer fatty acids have olefinic double bonds which make them capable of reactive solidification in the vicinity of the polyolefin surface.

Dialkanolamines containing at least partly olefinically unsaturated hydrocarbon radicals or dialkanolamides of unsaturated fatty acids are extremely effective dye compatibility improvers in the context of the teaching according to the present invention. This applies in particular to the corresponding diethanol derivatives. This class includes, for example, oleic acid diethanolamide and linoleic acid diethanolamide. Specifically included in this connection are technical products known to the expert, including the secondary components normally occurring therein. Examples of such products are "Comperlan OD" (technical oleic acid diethanolamide) and "Comperlan F" (technical linoleic acid diethanolamide), both commercial products of Henkel KGBA. However, such compounds as sorbitan monoesters with, in particular, ethylenically unsaturated fatty acids also lead to optimal results in the context of the teaching according to the invention.

The migration rate to be expected from the molecular structure of the particular additives (I) used may be one of the factors which determines the quantity of additives (I) to be used in each individual case. Lower limits to the size of the additions of additive (I) to the polyolefin are about 0.01% by weight and, more particularly, about 0.1% by weight. In general, it will be advisable to use at least about 0.2 to 0.8% by weight (based on the polyolefins). Optimum coating or adhesive compatibility values for the particular representatives of this class of substances used in each individual case as the additive (I) are generally achieved in the range from about 0.3 to 5% by weight and, more particularly, in the range from 0.4 to about 1% by weight.

As already mentioned, the optimum coating or adhesive compatibility to be adjusted is understandably determined by the chemical nature and by the possible interaction of the substituents of high polarity and optionally reactivity in the additive (I). The choice of additive (I) to be used in each individual case is determined by the particular stresses likely to be applied in the end product to the strength of the bond between the polyolefin and the coating or adhesive applied.

The combination of the teaching according to the invention which leads to high adhesive or coating compatibility values with technologies known per se for improving coating or adhesive compatibility on polyolefin surfaces falls within the scope of the teaching according to the invention. Thus, both mechanical and chemical and/or physical surface treatments of the outer polyolefin surface may be combined with the coating or adhesive compatibility modifications according to the invention. However, this is generally not necessary.

As already mentioned, the additives (I) are used in combination with transition metal compounds (II) during the molding of the polyolefins. The quantity of transition metal compound (II)—metal content of the transition metal compound (II) based on the polyolefins—is in the range from 0.1 to 1000 ppm. Basically, there are no particular restrictions in regard to the nature of the transition metal compounds (II). In principle, therefore, any transition metal compounds known to the expert may be used for the purposes of the teaching according to the invention. In one embodiment, transition metal salts, preferably salts based on organic acids containing 8 to 22 carbon atoms, are used as the transition metal compounds (II). In another embodiment, the transition metal compounds are used in a quantity below 5 ppm— metal content of the transition metal compound (II) based on the polyolefins.

If desired, other compounds known to the expert as catalysts for oxidative processes may be used in addition to the compulsory transition metal compounds (II) mentioned.

In one preferred embodiment, the ratio by weight of the additives (I) to the metal content of the transition metal compounds (II) is adjusted to a value of 10:0.1 to $10:10^{-7}$, preferably to a value of 10:0.02 to $10:10^{-6}$ and more preferably to a value of 10:0.01 to $10:10^{-5}$.

In the light of the teaching of EP-B-616 622 cited earlier on, the following observations may be made:

The teaching of the present invention on the one hand ensures that the improved and permanent coating or adhesive compatibility required is achieved and, on the other hand, that it is achieved without any adverse effect on other material parameters.

In one preferred embodiment, the transition metal compounds (II) are used in combination with additives (I) selected from the class of diethanolamides of unsaturated fatty acids. As already mentioned, the diethanolamides are preferably used as technical products.

According to the invention, the amphiphilic additives (I) are used in the course of routine molding processes, such as extrusion, calendering, injection molding and the like. It may be desirable to use components a), b) and c) in the form of a mixture prepared in advance. Other typical auxiliaries which have generally been successful in the molding of plastics and which are known to the expert, for example slip agents, antistatic agents, lubricants, release agents, UV stabilizers, antioxidants, fillers, fire retardants, mold release agents, nucleating agents and antiblocking agents, may also be separately made up and added during the final mixing of the end products. However, it may also be desirable, for example where extrusion is applied, to introduce components b) and/or c) and/or other additives either completely or partly into the polyolefin melt itself in the extruder, so that the mixture of components a), b) and c)—and optionally other auxiliaries—is not present from the outset as a made-up product, but is formed in the extruder itself. A technique such as this is appropriate, for example, when the additives (I) to be added to the polymer melt are present in liquid form and are easier to inject than to make up in advance.

It may even be desirable, although not necessary for obtaining the effect according to the invention, to undertake a conventional corona or plasma treatment after the use of components a) to c) in accordance with the invention.

Basically, any known ethylene- or propylene-based polymers and copolymers may be used as the basic oleophilic polyolefin material.

Mixtures of pure polyolefins with copolymers are also suitable in principle providing the additives (I) retain their ability to migrate in accordance with the invention and hence to collect at the surfaces of solids. Polymers particularly suitable for the purposes of the teaching according to the invention are listed below: poly(ethylenes), such as HDPE (high-density polyethylene), LDPE (low-density polyethylene), VLDPE (very-low-density polyethylene), LLDPE (linear low-density polyethylene), MDPE (medium-density polyethylene), UHMPE (ultra high molecular polyethylene), VPE (crosslinked polyethylene), HPPE (high-pressure polyethylene); isotactic polypropylene; syndiotactic polypropylene; Metallocen-catalyzed polypropylene, high-impact polypropylene, random copolymers based on ethylene and propylene, block copolymers based on ethylene and propylene; EPM (poly[ethylene-co-propylene]); EPDM (poly[ethylene-co-propylene-co-unconjugated diene]).

Other suitable polymers are: poly(styrene); poly(methylstyrene); poly(oxymethylene); Metallocen-catalyzed α-olefin or cycloolefin copolymers, such as norbomene/ethylene copolymers; perfluorinated polyolefins, polyvinyl chlodde, acrylonitrile/butadiene/styrene copolymers (ABS), styrene/butadiene/styrene or styrenelisoprenelstyrene copolymers (SIS or SBS); copolymers containing at least 80% ethylene and/or styrene and less than 20% monomers, such as vinyl acetate, acrylates, methacrylates, acrylic acid, acrylonitrile, vinyl chloride. Examples of such polymers are: poly(ethylene-co-ethyl acrylate), poly(ethylene-co-vinyl acetate), poly(ethylene-co-vinyl chloride), poly(styrene-co-acrylonitrile). Also suitable are graft copolymers and polymer blends, i.e. mixtures of polymers in which the above-mentioned polymers inter alia are present, for example polymer blends based on polyethylene and polypropylene.

Homopolymers and copolymers based on ethylene and propylene are particularly preferred for the purposes of the present invention. In one embodiment of the present invention, therefore, polyethylene on its own is used as the polyolefin; in another embodiment, polypropylene on its own is used as the polyolefin and, in a further embodiment, ethylene/propylene copolymers are used as the polyolefin.

The application of coatings or adhesives to the surface-modified polyolefin-based moldings and films obtained by the process according to the invention may basically be carried out by any of the relevant methods known to the expert.

According to the invention, there are no restrictions on the nature of the moldings. Examples are utility articles, such as fenders, wire coatings, spacers for safety glass, auto garnish moldings, ni-mold labels, bottles, plastic profiles, bottle crates, plastic boxes, toys, diaper films, formwork, housings for electronic or electrical equipment, surgical instruments, shoes and shoe parts, plastic bags, air balloons.

The present invention also relates to a process for the production of bonded and/or coated polyolefin-based moldings, fibers and films, characterized in that a mixture containing
a) predominantly one or more polyolefins,
b) 0.01 to 10% by weight, based on the polyolefins, of one or more migratable amphiphiles (additives 1) and
c) 0.01 to 1000 ppm of one or more transition metal compounds (II)—metal content of the transition metal compounds (II) based on the polyolefin—in which the transition metal is selected from the group consisting of titanium and tin is conventionally molded by extrusion, calendering, injection molding and the like at temperatures of 180 to 320° C. and the resulting polyolefin-based moldings, fibers and films with improved adhesive and/or coating compatibility are then contacted with an adhesive and/or a coating composition by conventional methods.

The following Examples are intended to illustrate the invention without limiting it in any way.

EXAMPLES

1. Materials Used 1.1. Polyolefin

In all the tests, a granular polypropylene ("Hostalen PPH 2150", a product of Hoechst AG) was used as the high molecular weight polyolefin.

1.2. Additives (I)

| | |
|---|---|
| Add-1: | 1-aminoethyl-2-oleyl imidazoline |
| Add-2: | oxazoline of castor oil fatty acid ("Loxamide VEP 8513", a product of Henkel KGaA, Düsseldorf) |
| Add-3: | selectively hydrogenated tallow fatty acid ("Edenor HTiCT", a product of Henkel KGaA, Düsseldorf) |

1.3. Transition metal compounds (II)

| | |
|---|---|
| Ni-acac: | nickel acetyl acetonate |
| Ti-lig: | mixture of titanium(IV) acetyl acetonate/dibutylate and cobalt-2-ethyl hexanoate (contains 2.5% by weight Co and 4.0% by weight Ti) |
| Sn-lig: | Mixture of tin(II) acetate and cobalt-2-ethyl hexanoate (contains 2.5% by weight Co and 4.0% by weight Sn) |

2. Production of Surface-modified Polypropylene by the Process According to the Invention In order to test the adhesive compatibility properties of surface-modified polypropylene, polypropylene was initially produced in tape form by mixing 600 g of polypropylene granules with 9.0 g (=1.5%) of additive (I) and 0.1 g of transition metal compound (11). The particular additive (I) and transition metal compound (II) used are shown in Tables 1 to 3 below. The mixtures were introduced through a hopper into an extruder. A Brabender DSK 42/7 twin-screw extruder (Brabender OHG, Duisberg) was used.

As well-known to the expert, an extruder is a machine for processing plastics in which both powder-formn and granular thermoplastics can be continuously mixed and plasticized.

Beneath the feed hopper, there is a contra-rotating twin screw longitudinally divided into three heating zones in addition to a water-cooling system which is intended to prevent premature melting of the granules or powder. The temperature of the heating zones and the rotational speed of the twin-screw can be controlled through a data-processing Plast-Corder PL 2000 which is connected to the extruded via a PC interface.

To produce the polypropylene tapes, the following temperatures were adjusted: heating zone I 250° C., heating zone II 270° C., heating zone III 290° C., the three heating zones being air-cooled to keep the temperatures constant.

The polypropylene granules (including the particular additive I and the transition metal compound II) were automatically taken into the extruder by the contra-rotating twin screw and transported along the screw. The rotational speed was 25 r.p.m. This guaranteed a relatively long residence time in the extruder and hence thorough compounding and homogenization. The resuwing homogeneous and substantially bubble-free mixture finally entered a nozzle which represents a fourth heating zone. The temperature of the nozzle was 300° C., i.e. the particular mixture left the extruder at that temperature.

After leaving the nozzle, the hot mixture flowed onto a conveyor belt of which the speed was adjusted so that a smooth and uniformly thick and wide tape was formed on cooling in air. In the tests described here, the speed was adjusted so that the polypropylene tape was about 35 mm wide and about 0.35 mm thick. Square test specimens were die-cut from this material and used for the dyeing tests described hereinafter.

Test specimens of pure polypropylene were used for comparison purposes. They were produced by the extrusion technique just described, except that polypropylene granules on their own, i.e. with no additive I or transition metal compound II added, were used. The test results based on this material are identified in Tables 1 to 3 by the abbreviation "Comp." in the first column.

3. Adhesion and Tensile Tests 3.1. Production of the Test Specimens

The extruded tapes produced in accordance with 2) were stored for various periods on the one hand at room temperature (20° C.) and, on the other hand, in a drying cabinet at 60° C. Square 25×25 mm pieces of polypropylene were then bonded between two 100×25 mm strips of wood. The bond had a thickness of 2 mm. The area bonded measured exactly 25×25=625mm².

The test specimens are illustrated by the following cross-sectional diagram (not drawn to scale):

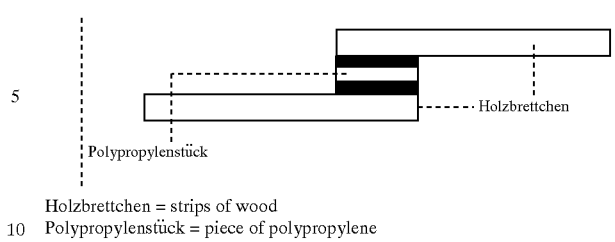

Holzbrettchen = strips of wood
Polypropylenstück = piece of polypropylene

In the diagram, the strips of wood and the piece of polypropylene are shown white and the adhesive black. The "wood strip/adhesive/polypropylene/adhesive/wood strip" arrangement is clearly apparent from the diagram.

A two-component adhesive ("Makroplast") polyurethane adhesive, a product of Henkel KGBA, Düsseldorf) was used as the adhesive. The two reactive components were stirred in a ratio of 5:1 in an aluminium dish. The pot life was about 1 hour.

After appropriate storage, 25 mm wide strips were cut off from each tape and, with the aid of a template, were bonded on both sides between two strips of wood. Five strips of each plastic tape were bonded. The use of a template ensures that the required surface to be bonded is kept to between the modified plastic and the strips of wood. Wooden clamps were used to fix the test specimen. Surplus adhesive was removed.

3.2. Tensile Tests

The test specimens produced in accordance with 3.1.) were stored for about 3 to 4 days at 20° C. to ensure that the two-component adhesive was fully cured. A Zwick universal testing machine was used to measure the tensile shear forces. The rate at which the test specimen was placed under tensile load was 15 mm/min. The bonded wood spatulas (=test specimens) were clamped in the damping jaws of the universal testing machine and pulled apart at the designated test rate. Care was taken to ensure that the test specimens were always arranged vertically and exactly in the middle of the testing machine.

TABLE 1

Results of the tensile tests (measurement of the tensile shear strengths)

| No. | Additive | Transition metal compound | Storage Days | ° C. | TSS value (x) |
|---|---|---|---|---|---|
| Comp. | None | None | 1 | 20 | 0.23 |
| Comp. | None | None | 7 | 60 | 0.21 |
| B1 | Add-1 | Ni-acac | 1 | 20 | 1.47 |
| B2 | Add-1 | Ni-acac | 7 | 60 | 1.25 |
| B3 | Add-2 | Ni-acac | 1 | 20 | 1.10 |
| B4 | Add-2 | Ni-acac | 7 | 60 | 1.80 |
| B5 | Add-3 | Ni-acac | 1 | 20 | 1.39 |
| B6 | Add-3 | Ni-acac | 7 | 60 | 1.81 |
| B7 | Add-2 | Ti-lig | 1 | 20 | 0.95 |
| B8 | Add-2 | Ti-lig | 7 | 60 | 1.50 |
| B9 | Add-2 | Sn-lig | 1 | 20 | 1.21 |
| B10 | Add-2 | Sn-lig | 7 | 60 | 1.35 |
| B11 | Add-1 | Ti-lig | 1 | 20 | 1.12 |
| B12 | Add-1 | Ti-lig | 7 | 60 | 1.34 |

(x) TSS value = tensile shear strength (in newtons/mm²)

What is claimed is:

1. A process for making a polyolefin composition having improved adhesive and/or coating compatbility comprising:
   (a) providing a polyolefin;
   (b) providing from 0.01 to 10% by weight, based on the weight of the polyolefin, of a migratable amphiphile;

(c) providing from 0.01 to 1000 ppm, based on the weight of the polyolefin, of a transition metal; and (d) combining (a–c) to form the polyolefin composition.

2. The process of claim 1 wherein the amphiphile has a molecular weight of from 50 to 3000 daltons.

3. The process of claim 1 wherein the amphiphile has an iodine value of from 10 to 200.

4. The process of claim 1 wherein the amphiphile contains a substituent of high polarity selected from the group consisting of a carboxyl group, a hydroxyl group, an amino group, an oxazoline group, an imidazoline group, an epoxide group, an isocyanate group, and derivatives thereof.

5. The process of claim 1 wherein the transition metal is employed in the form of a transition metal salt.

6. The process of claim 1 wherein the transition metal is present in the composition in an amount of less than 5 ppm, based on the weight of the polyolefin.

7. The process of claim 1 wherein the transition metal is selected from the group consisting of lead, nickel, zirconium, chromium, titanium, tin, and mixtures thereof.

8. The process of claim 1 wherein the polyolefin is selected from the group consisting of polyethylene, polypropylene, and mixtures thereof.

9. The process of claim 1 wherein the amphiphile and transition metal are present in the composition in a ratio by weight of from 10:0.1 to $10:10^{-7}$.

10. The process of claim 1 wherein (a)–(c) are combined by a method selected from the group consisting of extrusion, calendering, and injection molding, at a temperature of from 180 to 320° C.

11. The product of the process of claim 1.
12. The product of the process of claim 2.
13. The product of the process of claim 3.
14. The product of the process of claim 4.
15. The product of the process of claim 5.
16. The product of the process of claim 6.
17. The product of the process of claim 7.
18. The product of the process of claim 8.
19. The product of the process of claim 9.
20. The product of the process of claim 10.

\* \* \* \* \*